United States Patent
Stair et al.

(10) Patent No.: US 10,320,748 B2
(45) Date of Patent: Jun. 11, 2019

(54) SINGLE PACKET AUTHORIZATION IN A CLOUD COMPUTING ENVIRONMENT

(71) Applicant: AT&T Intellectual Property I, L.P., Atlanta, GA (US)

(72) Inventors: Michael Stair, Middletown, MD (US); Daniel Solero, Mooresville, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 126 days.

(21) Appl. No.: 15/441,004

(22) Filed: Feb. 23, 2017

(65) Prior Publication Data

US 2018/0241718 A1    Aug. 23, 2018

(51) Int. Cl.
*H04L 29/06* (2006.01)
*H04W 12/08* (2009.01)

(52) U.S. Cl.
CPC ........ *H04L 63/0236* (2013.01); *H04L 63/108* (2013.01); *H04W 12/08* (2013.01)

(58) Field of Classification Search
CPC ............. H04L 63/0236; H04L 63/0227; H04L 63/0263; H04L 63/08; H04W 12/08
USPC ...................................... 726/1, 4, 11, 13, 15
See application file for complete search history.

(56) References Cited

U.S. PATENT DOCUMENTS

| | | | |
|---|---|---|---|
| 6,098,172 A | 8/2000 | Coss et al. | |
| 6,170,012 B1 | 1/2001 | Coss et al. | |
| 6,854,063 B1 | 2/2005 | Qu et al. | |
| 7,051,365 B1 | 5/2006 | Bellovin | |
| 7,069,437 B2 | 6/2006 | Williams | |
| 7,143,438 B1 | 11/2006 | Coss et al. | |
| 8,590,031 B2 | 11/2013 | Dargis | |
| 8,627,442 B2* | 1/2014 | Ji | H04L 63/0245 726/11 |
| 8,799,985 B2* | 8/2014 | Vinberg | H04L 63/20 713/153 |

(Continued)

FOREIGN PATENT DOCUMENTS

WO    WO 97/00471    1/1997

OTHER PUBLICATIONS

"Single Packet Authorization; A Comprehensive Guide to Strong Service Hardening with fwknop," Cipher Dyne, cipherdyne.org, Jan. 11, 2013.

(Continued)

*Primary Examiner* — Hosuk Song
(74) *Attorney, Agent, or Firm* — Hartman & Citrin LLC (57) ABSTRACT

Concepts and technologies disclosed herein are directed to single packet authorization ("SPA") in a cloud computing environment. A compute node can include a virtual switch operating on at least a portion of a plurality of hardware resources of a cloud computing environment, a virtual firewall, a cloud workload executing a cloud service, and a SPA service. The virtual switch can receive a SPA request from a SPA client executing on a computing device. The virtual switch can forward the SPA request to the virtual firewall and to the SPA service. The virtual firewall can deny the SPA request in accordance with a firewall policy. The SPA service can utilize a SPA validation scheme to validate the SPA request. The virtual firewall can implement a temporary firewall policy to allow incoming packets from the SPA client and directed to the cloud service.

20 Claims, 6 Drawing Sheets

(56) References Cited

U.S. PATENT DOCUMENTS

| | | |
|---|---|---|
| 8,832,820 B2 * | 9/2014 | Barjatiya ............ H04L 63/0209 709/224 |
| 8,904,511 B1 * | 12/2014 | O'Neill ............... H04L 63/0263 709/223 |
| 8,984,610 B2 * | 3/2015 | Spiers ................. H04L 63/0218 726/9 |
| 9,084,233 B2 | 7/2015 | Rasanen |
| 9,124,579 B2 | 9/2015 | Lee |
| 9,210,126 B2 | 12/2015 | Rash et al. |
| 9,235,856 B2 * | 1/2016 | Parker ..................... H04L 67/10 |
| 9,270,639 B2 * | 2/2016 | Lopez ................. H04L 63/0218 |
| 9,424,577 B2 | 8/2016 | Mutha |
| 2001/0034844 A1 | 10/2001 | Bellovin |
| 2002/0069366 A1 | 6/2002 | Schoettger |
| 2002/0184510 A1 | 12/2002 | Shieh |
| 2003/0105872 A1 | 6/2003 | Han et al. |
| 2011/0107410 A1 | 5/2011 | Dargis |
| 2011/0154469 A1 | 6/2011 | Dargis |
| 2013/0227634 A1 | 8/2013 | Pal et al. |
| 2016/0012447 A1 | 1/2016 | Mutha |
| 2016/0028775 A1 | 1/2016 | Grimes et al. |
| 2016/0197900 A1 | 7/2016 | Forster et al. |

OTHER PUBLICATIONS

Rash, Michael, "Single Packet Authorization," Linux Journal, linuxjournal.com, Apr. 1, 2007.
Home page, Aldaba, aldabaknocking.com, Sep. 27, 2015.
"Single Packet Authorization," Ubuntu Documentation, help.ubuntu.com, Jun. 28, 2014.
Jeanquier, Sebastien, "An Analysis of Port Knocking and Single Packet Authorization," MSc Thesis, Information Security Group, Royal Holloway College, University of London, Sep. 9, 2006.

\* cited by examiner

SINGLE PACKET AUTHORIZATION IN A CLOUD COMPUTING ENVIRONMENT

BACKGROUND

Port knocking is an authentication technique that utilizes a pre-determined sequence of closed port connection attempts to specific Internet Protocol ("IP") addresses. This sequence is known in the art as a knock sequence. Port knocking utilizes a daemon that monitors firewall logs for the correct knock sequence. Port knocking essentially provides a dynamic configuration of a default drop firewall policy to allow temporary connections from authorized sources after an authentication request.

Single packet authorization ("SPA") is a next generation variation of port knocking technology. SPA allows a single "knock" implementation in which the knock consists of an encrypted packet that is captured passively by a SPA service. The SPA service validates the encrypted packet to allow temporary connections from authorized sources.

SUMMARY

Concepts and technologies disclosed herein are directed to SPA in a cloud computing environment. According to one aspect of the concepts and technologies disclosed herein, a compute node can include a virtual switch operating on at least a portion of a plurality of hardware resources of a cloud computing environment, a virtual firewall, a cloud workload executing a cloud service, and a SPA service. The virtual switch can receive a SPA request from a SPA client executing on a computing device. The virtual switch can forward the SPA request to the virtual firewall and to the SPA service. The virtual firewall can deny the SPA request in accordance with a firewall policy. The SPA service can utilize a SPA validation scheme to validate the SPA request. The virtual firewall can implement a temporary firewall policy to allow incoming packets from the SPA client and directed to the cloud service.

In some embodiments, the cloud workload includes one or more virtual machines. In some embodiments, the compute node includes multiple cloud workloads, each of which can be served by the SPA service.

In some embodiments, the SPA request is encoded with a credential. The credential can be, for example, a symmetric and/or asymmetric cryptographic key. In some embodiments, the SPA validation routine includes verifying that the credential is valid and that access to the cloud workload is allowed.

In some embodiments, the compute node can include a software-defined networking ("SDN") controller. In these embodiments, the SPA service is a function of the SDN controller.

In some embodiments, the virtual firewall determines whether the temporary firewall policy has expired. In response to determining that the temporary firewall policy has expired, the virtual firewall can deny incoming packets from the SPA client. This logic can be implemented in either the virtual firewall (general firewall rules have a time-to-live) or enforced by the SPA service (firewall rules are removed by the SPA service after a timeout).

In some embodiments, the SPA request specifies a port and a protocol to be allowed in accordance with the temporary firewall policy. For example, if the SPA request is for secure shell ("SSH") access on Transmission Control Protocol ("TCP") port 22, the temporary firewall policy can be added to the virtual firewall to allow packets from a client IP address of the SPA client with TCP protocol and a destination port of 22 to be forwarded to the cloud workload.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to SPA in a cloud computing environment. According one aspect of the concepts and technologies disclosed herein, SPA can be provided as a cloud service to enforce authenticated on-demand network access. The integration of the SPA service directly into cloud-based virtual networking functions greatly simplifies SPA adoption by removing the burden for each independent application to manage the SPA implementation. Cloud compute nodes provide the processing, memory, storage, and networking for virtual workloads. Moreover, the integration of SPA service handles highly-dynamic workloads and lightweight containers that may not support dedicated host-level firewalls.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for SPA in a cloud computing environment will be described.

Figure 1:
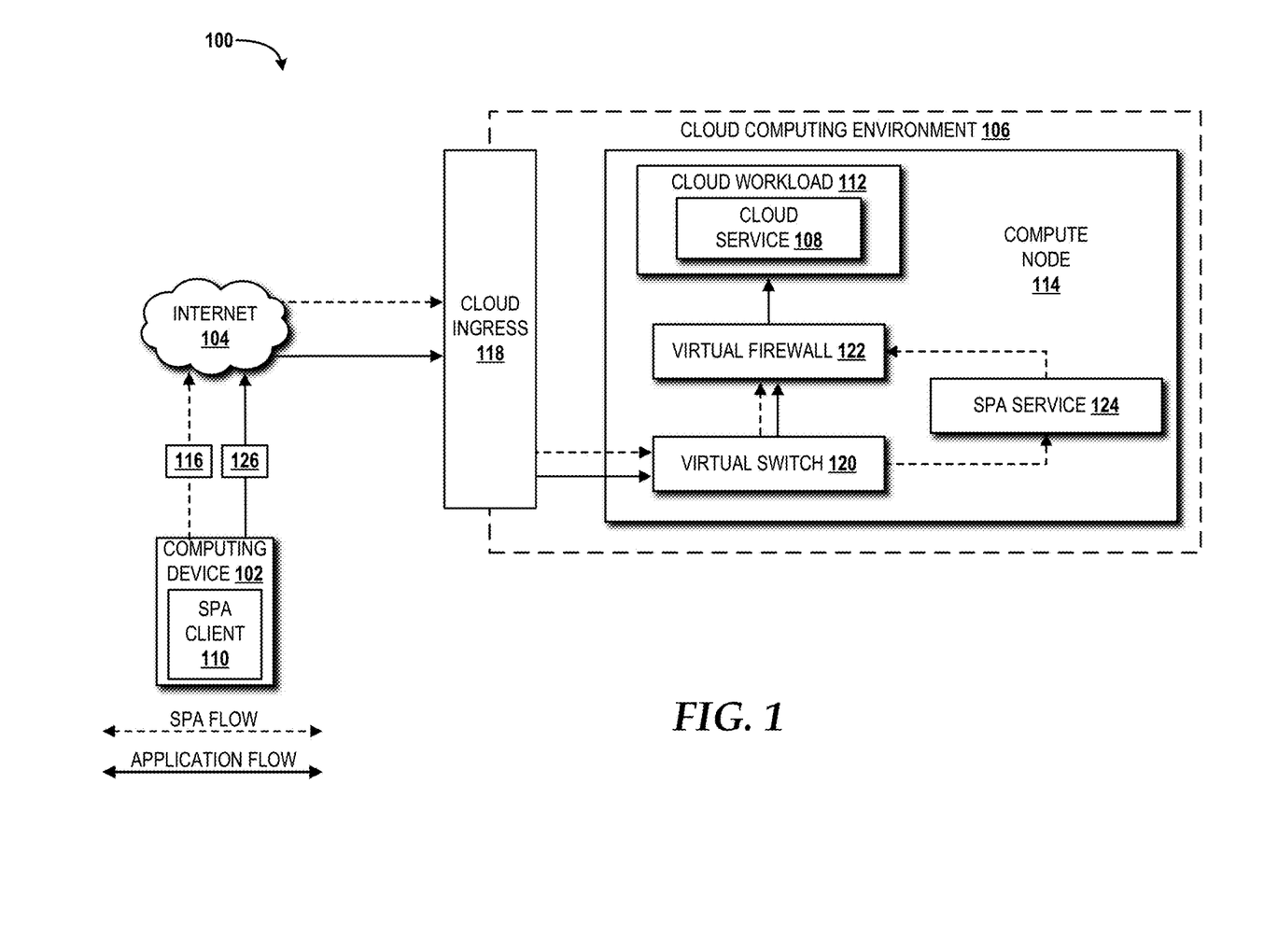
FIG. 1 is a block diagram illustrating an illustrative operating environment capable of implementing aspects of the concepts and technologies disclosed herein.

Turning now to FIG. 1, an operating environment 100 in which aspects of the concepts and technologies disclosed herein can be implemented will be described, according to an embodiment. The illustrated operating environment 100 includes a computing device 102 operating in communication with the Internet 104 through which the computing device 102 can communicate with a cloud computing environment 106 to access and utilize one or more cloud services ("cloud service") 108. The cloud service 108 can provide, at least in part, any type of cloud service or combination of cloud services, including Infrastructure as a Service ("IaaS"), Platform as a Service ("PaaS"), and/or Software as a Service ("SaaS"). For purposes of description and not limitation, the cloud service 108 will be described in context of a remote access service, whereby the computing device 102 can connect to and access resources provided via the cloud computing environment 106. It should be understood that this implementation of the cloud service 108 is merely illustrative of but one service that can benefit from the concepts and technologies disclosed herein with regard to security. The concepts and technologies disclosed herein can be extended to other services, including those listed above and others known to those skilled in the art. Moreover, one skilled in the art will appreciate the applicability of the concepts and technologies disclosed herein and variations thereof to future services.

According to various embodiments, the functionality of the computing device 102 may be provided by one or more mobile telephones, smartphones, tablet computers, slate computers, smart watches, smart glasses (e.g., the GOOGLE GLASS family of products), other wearable devices, other smart devices, Internet of Things ("IoT") devices, security devices, media playback devices, televisions, set-top devices, navigation devices, connected cars, laptop computers, notebook computers, ultrabook computers, netbook computers, server computers, computers of other form factors, computing devices of other form factors, other computing systems, other computing devices, and/or the like. It should be understood that the functionality of the computing device 102 can be provided by a single device, by two or more similar devices, and/or by two or more dissimilar devices.

The illustrated computing device 102 can execute, via one or more processors (best shown in FIGS. 4 and 5) a SPA client application ("SPA client") 110 to generate a SPA request directed to the cloud service 108 running on a cloud workload 112 within a compute node 114 of the cloud computing environment 106. The cloud workload 112, in some embodiments, can be or can include one or more virtual machines ("VMs"). In other embodiments, the cloud workload 112 can be or can include a containerized operating system ("OS") virtualization. The cloud workload 112 alternatively can be embodied as one or more other virtualizations upon which or otherwise associated with the execution of one or more instructions of the cloud service 108. The cloud workload 112 is IP-addressable, and therefore is accessible directly from any host that has Internet connectivity.

An illustrative networking and workflow involved in communication of a SPA request 116 from the SPA client 110 to the cloud service 108 running on the cloud workload 112 will now be described. The SPA client 110 generates the SPA request 116 and sends the SPA request 116 to the cloud computing environment 106, and more particularly, to a cloud ingress 118. The cloud ingress 118 designates the edge of the cloud computing environment 106 boundary from the Internet 104 and routes incoming SPA flow, including the SPA request 116, and application flow from the computing device 102 towards one or more compute nodes, such as the illustrated compute node 114, in the cloud computing environment 106. The illustrated compute node 114 hosts the cloud workload 112 and software-defined network ("SDN") functions, including a virtual switch 120 and a virtual firewall 122. The virtual switch 120 supports routing and switching operations for communications to and from the compute node 114. The virtual firewall 122 restricts communication to the cloud workload 112 in accordance with one or more firewall policies. Although the compute node 114 is shown with SDN functions embodied as the virtual switch 120 and the virtual firewall 122, it should be understood that the compute node 114 can support other SDN functions, such as, for example, routers, hubs, repeaters, servers, gateways, other network elements, some combination thereof, and/or the like.

As used herein, "SDN" refers to an architectural framework for creating intelligent networks that are programmable, application-aware, and more open than traditional networks. In accordance with the concepts and technologies disclosed herein, SDN concepts are utilized to provide virtual switching and firewall functions to support access to the cloud service 108. SDN allows for the creation of multiple virtual network control planes on common hardware. SDN can help extend service virtualization and software control into many existing network elements. Moreover, SDN enables applications to request and to manipulate services provided by the network and to allow the network to expose network states back to applications. SDN exposes network capabilities through application programming interfaces ("APIs"), making the control of network equipment remotely accessible and modifiable via third-party software clients.

Figure 3:
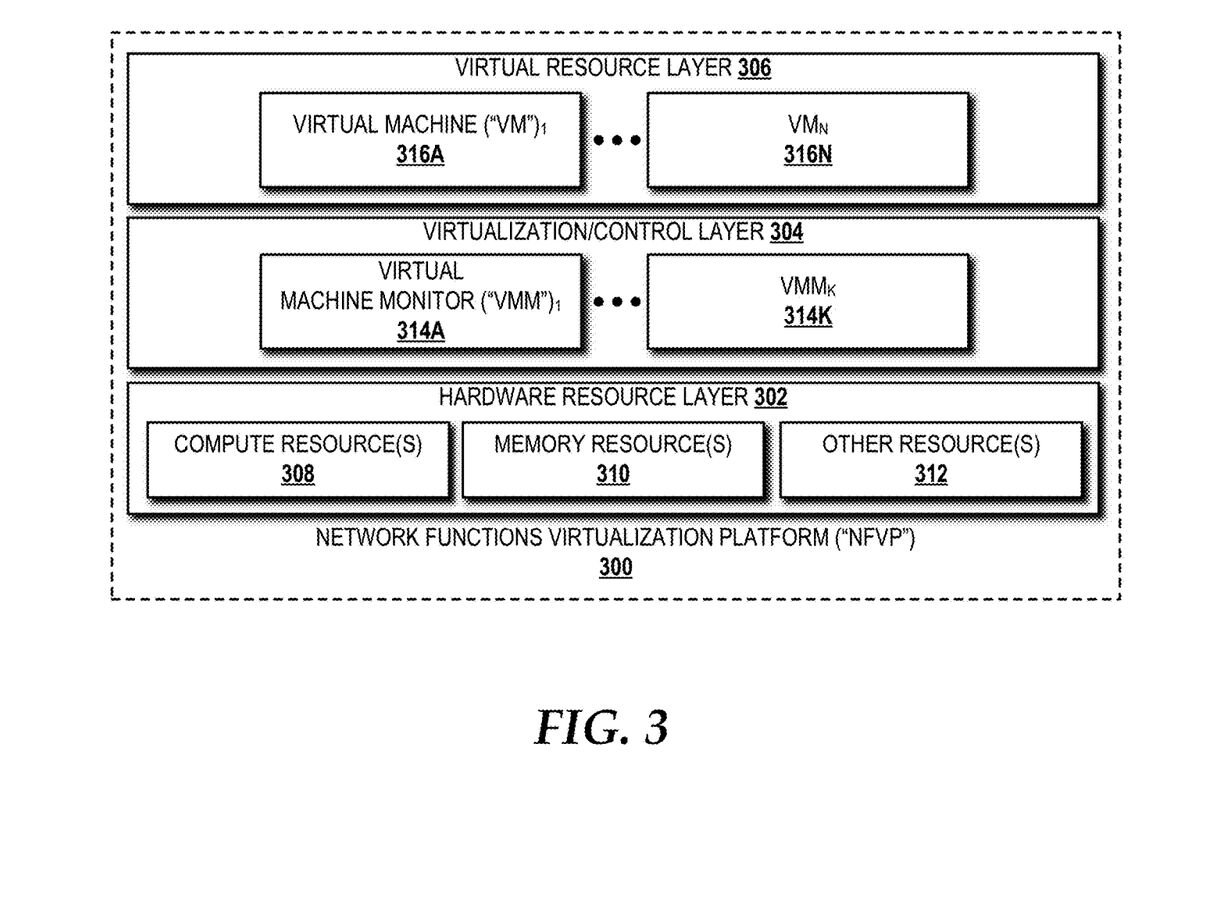
FIG. 3 is a block diagram illustrating an example network functions virtualization platform ("NFVP") and components thereof capable of implementing aspects of the embodiments presented herein.

In some embodiments, at least a portion of the SDN elements (i.e., the virtual switch 120 and the virtual firewall 122), other components of the compute node 114, and/or other components of the cloud computing environment 106 are created utilizing a network functions virtualization platform ("NFVP") (best shown in FIG. 3). An NFVP is a shared infrastructure that can support multiple services and network. The NFVP can include a plurality of hardware resources, including, for example, processing/compute resources, memory resources, and other resources such as input/output ("I/O") resources. These resources can be virtualized and managed by one or more virtual machine monitors ("VMMs") (also known as "hypervisors") to manage one or more virtual resources as abstractions of at least a portion of the hardware resources. These abstractions can be referred to as workloads (e.g., VMs), such as the cloud workload 112.

The compute node 114 also includes a SPA service 124. The SPA service 124 can be a compute node networking function that validates and manages SPA requests, such as the SPA request 116, directed to the cloud workload 112. The SPA service 124 can be provided as a standalone function as shown in the illustrated example, or can be combined with other functions of the compute node 114, including, for example, the virtual switch 120, the virtual firewall 122, and/or other SDN functions such as an SDN controller (not shown).

A request 126 for application access (i.e., access to the cloud service 108) on the cloud workload 112 is preceded by the SPA request 116. SPA packets, such as the SPA request 116, encountered by the virtual switch 120 are forwarded to the SPA service 124 for validation. Validated SPA requests are implemented in the virtual firewall 122 for subsequent cloud service 108 access on the workload 112. Additional details in this regard will be described below with reference to FIG. 2.

Although only one computing device 102, one cloud computing environment 106, one cloud service 108, one SPA client 110, one cloud workload 112, one compute node 114, one SPA request 116, one cloud ingress 118, one virtual switch 120, one virtual firewall 122, one SPA service 124, and one request 126 are shown in the illustrated operating environment 100, multiples of one or more of these elements are contemplated. As such, the illustrated embodiment should not be construed as being limiting in any way.

Figure 2:
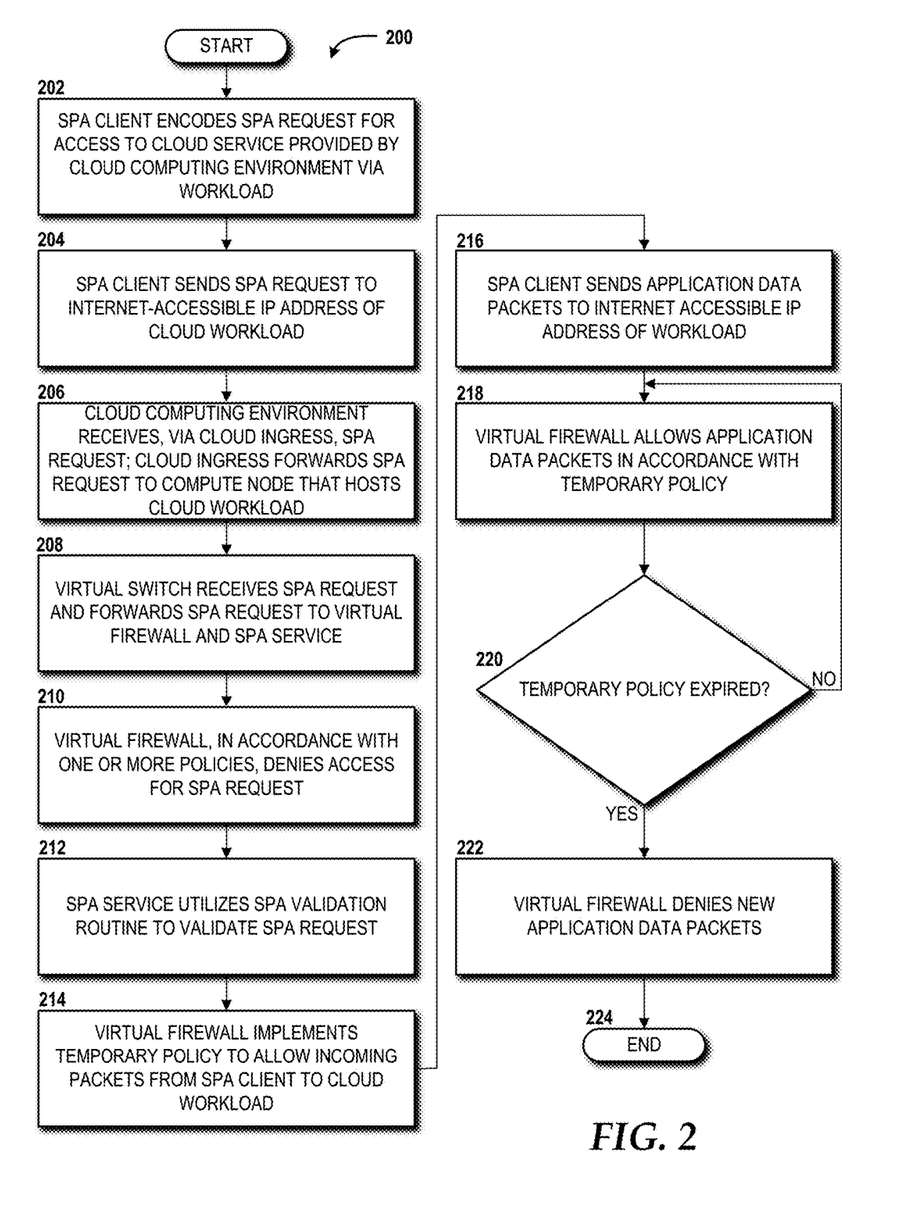
FIG. 2 is a flow diagram illustrating aspects of a method for providing a SPA service in a cloud computing environment, according to an illustrative embodiment.

Turning now to FIG. 2, aspects of a method 200 for providing the SPA service 124 in the cloud computing environment 106 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 200 is described as being performed, at least in part, by one of the processors via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202, where the SPA client 110 encodes the SPA request 116 for access to the cloud service 108 provided by the cloud computing environment 106 via the cloud workload 112. In some embodiments, the SPA client 110 can utilize secrets, such as symmetric and/or asymmetric cryptographic keys, contracted with the SPA service 124. In this example, the cloud service 108 is or includes remote terminal access using secure shell ("SSH"). The method 200 can be applied to other cloud services, and as such, the aforementioned example should not be construed as being limiting in any way.

From operation 202, the method 200 proceeds to operation 204, where the SPA client 110 sends the SPA request 116 to the Internet-accessible IP address associated with the cloud workload 112. From operation 204, the method 200 proceeds to operation 206, where the cloud computing environment 106 receives, via the cloud ingress 118, the SPA request 116 from the SPA client 110 via the Internet 104. The cloud ingress 118 then forwards the SPA request 116 to the compute node that hosts the destination cloud workload associated with the destination IP address—that is, to the compute node 114 that hosts the cloud workload 112 in the example illustrated in FIG. 1.

From operation 206, the method 200 proceeds to operation 208, where the virtual switch 120 receives the SPA request 116 and forwards the SPA request 116 to the virtual firewall 122 and to the SPA service 124. The virtual switch 120 can be designed to forward a copy of all incoming packets, including the SPA request 116, to the SPA service 124. As with all traffic, the SPA request 116 also is routed to the virtual firewall 122, which determines if a firewall policy (or set of policies) for the cloud workload 112 will allow the SPA request 116 to be delivered. Prior to the SPA request 116 being validated by the SPA service 124, the virtual firewall 122 will deny the SPA request 116. From operation 208, the method 200 proceeds to operation 210, where the virtual firewall 122, in accordance with one or more policies, denies access for the SPA request 116.

From operation 210, the method 200 proceeds to operation 212, where the SPA service 124 utilizes a SPA validation routine to validate the SPA request 116. The validation routine can include operations for verifying the authentication (i.e., the SPA request 116 is encoded with proper credentials) and authorization (i.e., the resource—cloud workload 112—being requested is allowed). Once validated, a temporary firewall policy to allow the SPA request 116 is implemented in the virtual firewall 122. If the SPA request 116 is for SSH access on Transmission Control Protocol ("TCP") port 22, for example, a temporary firewall policy can be added to the virtual firewall 122 to allow packets from the client IP address with TCP protocol and a destination port of 22 to be forwarded to the cloud workload 112.

Integrating SPA validation as a compute node service supports SPA management for any workload hosted on a given compute node.

From operation 212, the method 200 proceeds to operation 214, where the virtual firewall 122 implements a temporary firewall policy to allow incoming packets from the SPA client 110 to the cloud workload 112. From operation 214, the method 200 proceeds to operation 216, where the SPA client 110 sends application data packets to the Internet-accessible IP address of the cloud workload 112. From operation 216, the method 200 proceeds to operation 218, where the virtual firewall 122 allows the application data packets in accordance with the temporary firewall policy. From operation 218, the method 200 proceeds to operation 220, where the virtual firewall 122 checks whether the temporary firewall policy has expired. This timer logic can be provided by the virtual firewall 122 or the SPA service 124. If the virtual firewall 122 determines that the temporary firewall policy has not expired, the method 200 returns to operation 218, where the virtual firewall 122 allows the application data packets in accordance with the temporary firewall policy. If, however, the virtual firewall 122 determines that the temporary firewall policy has expired, the method 200 proceeds to operation 222, where the virtual firewall 122 denies any new application data packet from the SPA client 110. This timer logic also can be provided by the virtual firewall 122 or the SPA service 124. From operation 222, the method 200 proceeds to operation 224, where the method 200 ends.

Turning now to FIG. 3, a network functions virtualization platform ("NFVP") 300 will be described, according to an exemplary embodiment. The architecture of the NFVP 300 can be utilized to implement various elements disclosed herein, including, for example, the cloud computing environment 106. The NFVP 300 is a shared infrastructure that can support multiple services and network applications. The illustrated NFVP 300 includes a hardware resource layer 302, a virtualization/control layer 304, and a virtual resource layer 306 that work together to perform operations as will be described in detail herein.

The hardware resource layer 302 provides hardware resources, which, in the illustrated embodiment, include one or more compute resources 308, one or more memory resources 310, and one or more other resources 312. The compute resource(s) 308 can include one or more hardware components that perform computations to process data, and/or to execute computer-executable instructions of one or more application programs, operating systems, and/or other software. The compute resources 308 can include one or more central processing units ("CPUs") configured with one or more processing cores. The compute resources 308 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 308 can include one or more discrete GPUs. In some other embodiments, the compute resources 308 can include CPU and GPU components that are configured in accordance with a co-processing CPU/GPU computing model, wherein the sequential part of an application executes on the CPU and the computationally-intensive part is accelerated by the GPU. The compute resources 308 can include one or more system-on-chip ("SoC") components along with one or more other components, including, for example, one or more of the memory resources 310, and/or one or more of the other resources 312. In some embodiments, the compute resources 308 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 308 can be or can include one or more hardware components architected in accordance with an advanced reduced instruction set computing ("RISC") ("ARM") architecture, available for license from ARM HOLDINGS of Cambridge, United Kingdom. Alternatively, the compute resources 308 can be or can include one or more hardware components architected in accordance with an x86 architecture, such an architecture available from INTEL CORPORATION of Mountain View, Calif., and others. Those skilled in the art will appreciate the implementation of the compute resources 308 can utilize various computation architectures, and as such, the compute resources 308 should not be construed as being limited to any particular computation architecture or combination of computation architectures, including those explicitly disclosed herein.

The memory resource(s) 310 can include one or more hardware components that perform storage operations, including temporary or permanent storage operations. In some embodiments, the memory resource(s) 310 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 308.

The other resource(s) 312 can include any other hardware resources that can be utilized by the compute resources(s) 308 and/or the memory resource(s) 310 to perform operations described herein. The other resource(s) 312 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 302 can be virtualized by one or more virtual machine monitors ("VMMs") 314A-314K (also known as "hypervisors;" hereinafter "VMMs 314") operating within the virtualization/control layer 304 to manage one or more virtual resources that reside in the virtual resource layer 306. The VMMs 314 can be or can include software, firmware, and/or hardware that alone or in combination with other software, firmware, and/or hardware, manages one or more virtual resources operating within the virtual resource layer 306.

The virtual resources operating within the virtual resource layer 306 can include abstractions of at least a portion of the compute resources 308, the memory resources 310, the other resources 312, or any combination thereof. These abstractions are referred to herein as VMs. In the illustrated embodiment, the virtual resource layer 306 includes VMs 316A-316N (hereinafter "VMs 316"). Each of the VMs 316 can execute one or more applications to perform the operations described herein. In the embodiment illustrated in FIG. 1, the cloud workload 112 can be one of the VMs 316 executing the cloud service 108.

Figure 4:
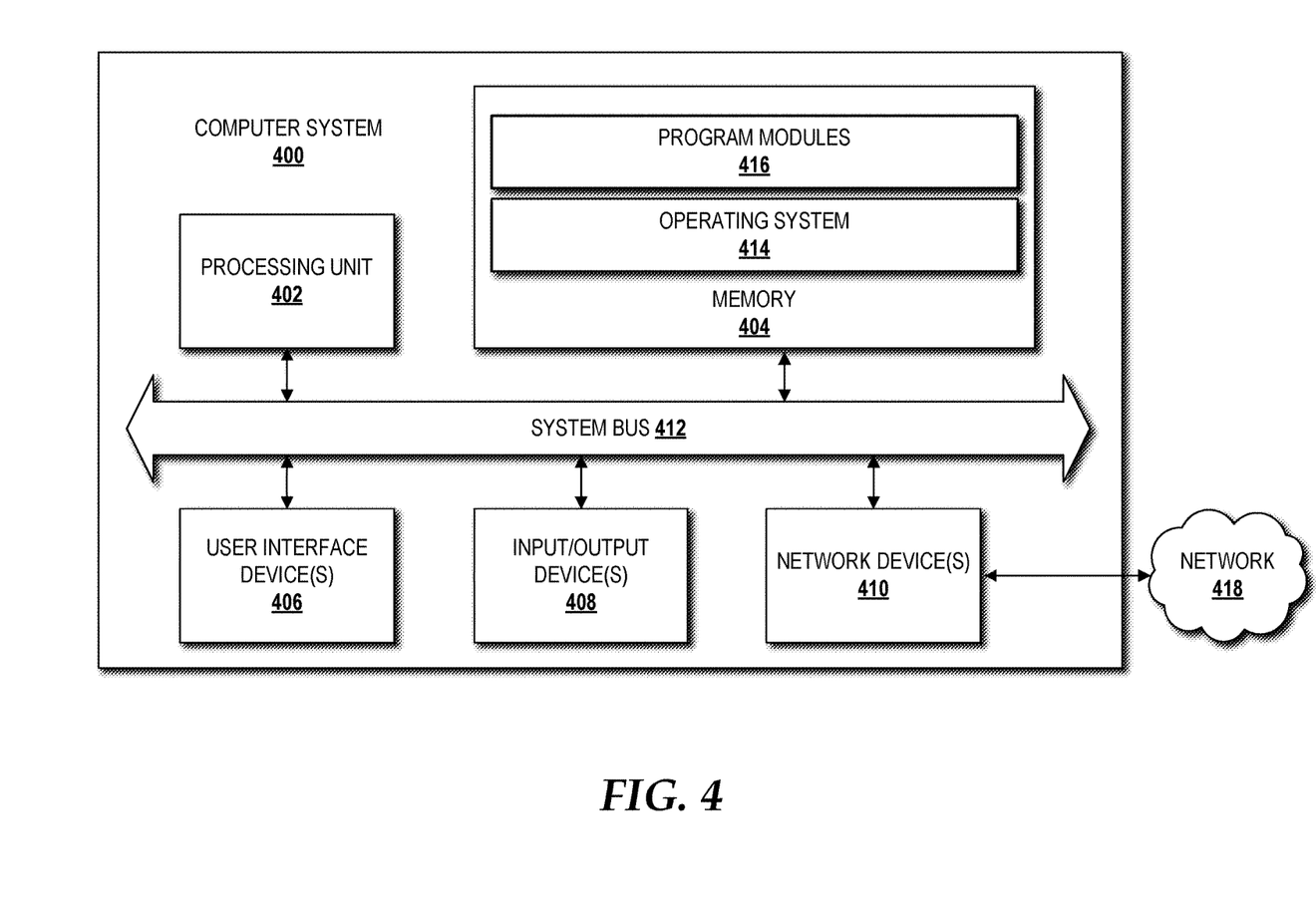
FIG. 4 is a block diagram illustrating an example computer system and components thereof capable of implementing aspects of the embodiments presented herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. For example, the computing device 102 can utilize, at least in part, an architecture that is the same as or at least similar to the architecture of the computer system 400. It should be understood, however, that modification to the architecture may be made to facilitate certain interactions among elements described herein.

The computer system 400 includes a processing unit 402, a memory 404, one or more user interface devices 406, one or more I/O devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, personal digital assistant ("PDAs"), cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), or a wired Metropolitan Area Network ("MAN"). The network 418 can be or can include the Internet 104, or any other network or combination of networks described herein.

Figure 5:
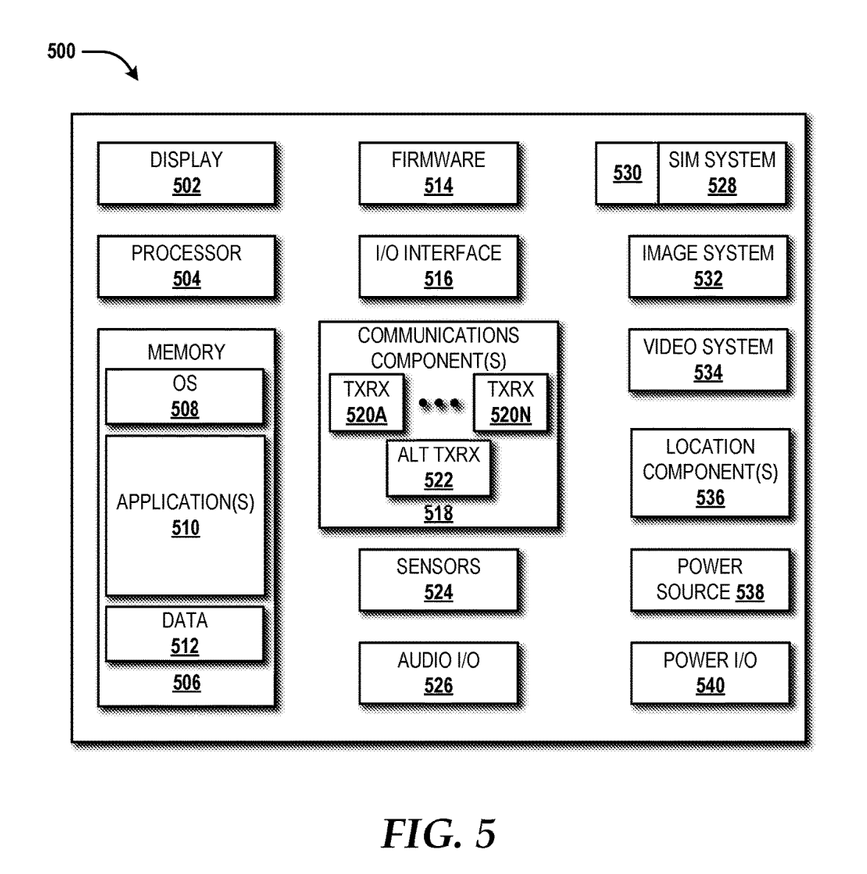
FIG. 5 is a block diagram illustrating an example mobile device and components thereof capable of implementing aspects of the embodiments presented herein.

Turning now to FIG. 5, an illustrative mobile device 500 and components thereof will be described. In some embodiments, the computing device 102 can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UP") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in viewing conference media, entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as universal serial bus ("USB") port, a mini-USB port, a micro-USB port, an audio jack, a PS2 port, an Institute of Electrical and Electronics Engineers ("IEEE") 1394 ("FIREWIRE") port, a serial port, a parallel port, an Ethernet (RJ45) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA ONE, CDMA2000, LTE, and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
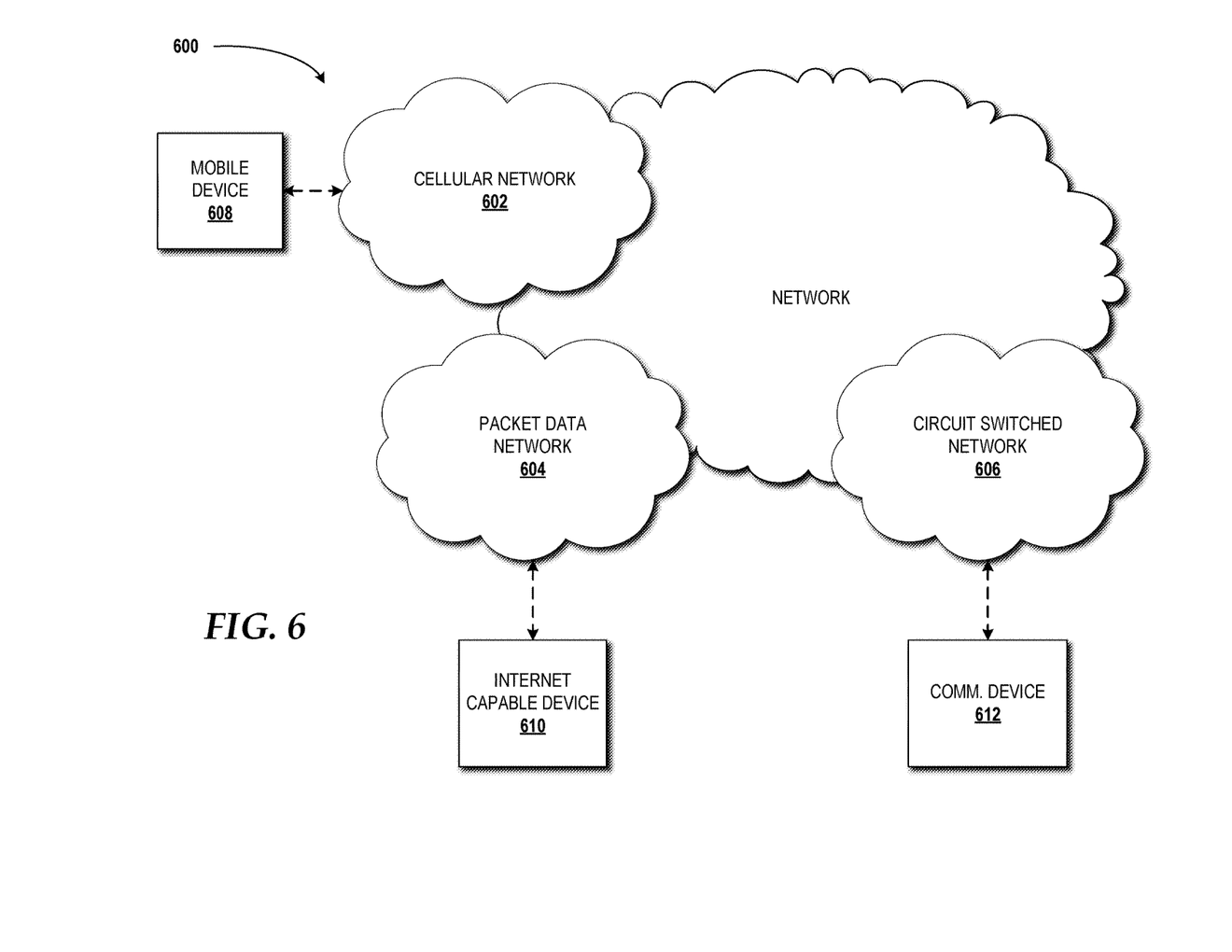
FIG. 6 is a block diagram illustrating an example network capable of implementing aspects of the embodiments presented herein.

Turning now to FIG. 6, details of a network 600 are illustrated, according to an illustrative embodiment. The network 600 includes a cellular network 602, a packet data network 604, for example, the Internet 104, and a circuit switched network 606, for example, a publicly switched telephone network ("PSTN").

The cellular network 602 includes various components such as, but not limited to, base transceiver stations ("BTSs"), nodeBs ("NBs"), eNBs, base station controllers ("BSCs"), radio network controllers ("RNCs"), mobile switching centers ("MSCs"), MMES, SGWs, PGWs, short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the computing device 102, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like.

Based on the foregoing, it should be appreciated that concepts and technologies directed to SPA in a cloud computing environment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A compute node comprising:
    a virtual switch operating on at least a portion of a plurality of hardware resources of a cloud computing environment;
    a virtual firewall;
    a cloud workload executing a cloud service; and
    a single packet authorization service;
    wherein the virtual switch
        receives a single packet authorization request from a single packet authorization client executing on a computing device external to and in communication with the cloud computing environment via a network, and
        forwards the single packet authorization request to the virtual firewall and to the single packet authorization service; and
    wherein the virtual firewall denies the single packet authorization request in accordance with a firewall policy;
    wherein the single packet authorization service utilizes a single packet authorization validation scheme to validate the single packet authorization request; and
    wherein the virtual firewall implements a temporary firewall policy to allow incoming packets from the single packet authorization client and directed to the cloud service.

2. The compute node of claim 1, wherein the cloud workload comprises a virtual machine.

3. The compute node of claim 1, wherein the single packet authorization request is encoded with a credential.

4. The compute node of claim 3, wherein the single packet authorization validation scheme comprises verifying that the credential is valid and that access to the cloud workload is allowed.

5. The compute node of claim 1, further comprising a software-defined networking controller; and wherein the single packet authorization service is a function of the software-defined networking controller.

6. The compute node of claim 1, wherein the virtual firewall determines whether the temporary firewall policy has expired, and in response to determining that the temporary firewall policy has expired, denying incoming packets from the single packet authorization client.

7. The compute node of claim 1, further comprising a further cloud workload; and wherein the single packet authorization service also serves the further cloud workload.

8. The compute node of claim 1, wherein the single packet authorization request specifies a port and a protocol to be allowed in accordance with the temporary firewall policy.

9. A method comprising:
receiving, by a virtual switch operating on a compute node that, in turn, is operating on at least a portion of a plurality of hardware resources of a cloud computing environment, a single packet authorization request from a single packet authorization client executing on a computing device external to and in communication with the cloud computing environment via a network;
forwarding, by the virtual switch, the single packet authorization request to a virtual firewall and to a single packet authorization service;
denying, by the virtual firewall, the single packet authorization request in accordance with a firewall policy;
utilizing, by the single packet authorization service, a single packet authorization validation scheme to validate the single packet authorization request; and
implementing, by the virtual firewall, a temporary firewall policy to allow incoming packets from the single packet authorization client and directed to a cloud workload executing a cloud service within the compute node.

10. The method of claim 9, wherein the cloud workload comprises a virtual machine.

11. The method of claim 9, wherein the single packet authorization request is encoded with a credential.

12. The method of claim 11, wherein the single packet authorization validation scheme comprises verifying that the credential is valid and that access to the cloud workload is allowed.

13. The method of claim 9, further comprising determining whether the temporary firewall policy has expired, and in response to determining that the temporary firewall policy has expired, denying incoming packets from the single packet authorization client.

14. The method of claim 9, wherein the single packet authorization request specifies a port and a protocol to be allowed in accordance with the temporary firewall policy.

15. A computer-readable storage medium having instructions stored thereon that, when executed by at least a portion of processing resources of a plurality of hardware resources of a cloud computing environment, cause the at least the portion of processing resources to perform operations comprising:
receiving, by a virtual switch, a single packet authorization request from a single packet authorization client executing on a computing device external to and in communication with the cloud computing environment via a network;
forwarding, by the virtual switch, the single packet authorization request to a virtual firewall and to a single packet authorization service;
denying, by the virtual firewall, the single packet authorization request in accordance with a firewall policy;
utilizing, by the single packet authorization service, a single packet authorization validation scheme to validate the single packet authorization request; and
implementing, by the virtual firewall, a temporary firewall policy to allow incoming packets from the single packet authorization client and directed to a cloud workload executing a cloud service within the compute node.

16. The computer-readable storage medium of claim 15, wherein the cloud workload comprises a virtual machine.

17. The computer-readable storage medium of claim 15, wherein the single packet authorization request is encoded with a credential.

18. The computer-readable storage medium of claim 17, wherein the single packet authorization validation scheme comprises verifying that the credential is valid and that access to the cloud workload is allowed.

19. The computer-readable storage medium of claim 15, wherein the operations further comprise determining whether the temporary firewall policy has expired, and in response to determining that the temporary firewall policy has expired, denying incoming packets from the single packet authorization client.

20. The computer-readable storage medium of claim 19, wherein the single packet authorization request specifies a port and a protocol to be allowed in accordance with the temporary firewall policy.

* * * * *